(12) United States Patent
Dieckmann et al.

(10) Patent No.: US 10,744,993 B2
(45) Date of Patent: Aug. 18, 2020

(54) METHOD FOR MONITORING A BRAKE FOR MOTOR VEHICLES, BRAKE SYSTEM FOR IMPLEMENTING THE METHOD, AND MOTOR VEHICLE COMPRISING SAME

(71) Applicant: WABCO Europe BVBA, Brussels (BE)

(72) Inventors: Thomas Dieckmann, Pattensen (DE); Marcos Keller, Weinheim (DE); Denis Kusin, Nienburg (DE); Torsten Wallbaum, Duingen (DE)

(73) Assignee: WABCO EUROPE BVBA, Brussels (BE)

( * ) Notice: Subject to any disclaimer, the term of this patent is extended or adjusted under 35 U.S.C. 154(b) by 1 day.

(21) Appl. No.: 15/546,670

(22) PCT Filed: Feb. 3, 2016

(86) PCT No.: PCT/EP2016/000176
§ 371 (c)(1),
(2) Date: Jul. 27, 2017

(87) PCT Pub. No.: WO2016/124331
PCT Pub. Date: Aug. 11, 2016

(65) Prior Publication Data
US 2018/0029583 A1   Feb. 1, 2018

(51) Int. Cl.
*B60T 17/22*   (2006.01)
*F16D 66/02*   (2006.01)
(Continued)

(52) U.S. Cl.
CPC ............ *B60T 17/221* (2013.01); *B60T 13/24* (2013.01); *B60T 13/662* (2013.01);
(Continued)

(58) Field of Classification Search
CPC ...... B60T 13/24; B60T 13/662; B60T 13/683; B60T 13/686; B60T 17/22; B60T 17/221;
(Continued)

(56) References Cited

U.S. PATENT DOCUMENTS 3,847,449 A * 11/1974 Adahan ................. B60T 8/4018
                                                  303/116.4
5,669,678 A    9/1997 Stumpe et al.
(Continued)

FOREIGN PATENT DOCUMENTS

DE         4424270 A1    1/1996
DE       19517708 A1   11/1996
(Continued)

OTHER PUBLICATIONS

English Machine Translation of DE-102012102579 description and claims (Year: 2013).*

*Primary Examiner* — Melody M Burch
(74) *Attorney, Agent, or Firm* — Leydig, Voit & Mayer, Ltd.

(57) ABSTRACT

A method monitoring a pneumatically actuatable brake for motor vehicles, wherein an air gap of the brake is ascertained using measured position values provided by a brake wear sensor, includes ascertaining a reference position value of the brake wear sensor during unbraked travel, determining multiple value pairs of discrete position values and a current brake pressure P at a same point in time during a braking procedure, ascertaining a characteristic function interpolating the value pairs, determining a characteristic position value according to the characteristic function for a selected brake pressure, and determining an actual value of the air gap by subtracting the reference position value from the characteristic position value.

18 Claims, 3 Drawing Sheets

(51) Int. Cl.
*B60T 13/66* (2006.01)
*B60T 13/68* (2006.01)
*B60T 13/24* (2006.01)
*F16D 66/00* (2006.01)

(52) U.S. Cl.
CPC .......... *B60T 13/683* (2013.01); *B60T 13/686* (2013.01); *B60T 17/22* (2013.01); *F16D 66/02* (2013.01); *F16D 66/026* (2013.01); *F16D 2066/003* (2013.01)

(58) Field of Classification Search
CPC ................. F16D 66/026; F16D 66/003; F16D 2066/003; F16D 66/02
See application file for complete search history.

(56) References Cited

U.S. PATENT DOCUMENTS

| | | | |
|---|---|---|---|
| 5,720,534 A | 2/1998 | Stumpe | |
| 6,481,805 B1* | 11/2002 | Ichinose | B60T 7/042 188/72.3 |
| 8,328,297 B2* | 12/2012 | Hatano | B60T 8/4081 303/113.4 |
| 2005/0269872 A1* | 12/2005 | Ralea | B60T 8/00 303/20 |
| 2007/0052289 A1* | 3/2007 | Nilsson | B60T 8/885 303/20 |
| 2007/0235268 A1* | 10/2007 | Caron | B60T 17/221 188/71.8 |
| 2009/0032342 A1* | 2/2009 | Yamaguchi | B60T 13/741 188/72.3 |
| 2011/0031072 A1* | 2/2011 | Leiber | B60T 8/00 188/72.3 |
| 2013/0261890 A1* | 10/2013 | Roberts | F16D 65/568 701/36 |
| 2015/0176668 A1 | 6/2015 | Miller | |
| 2015/0330470 A1 | 11/2015 | Siebke | |

FOREIGN PATENT DOCUMENTS

| | | |
|---|---|---|
| DE | 19521401 C1 | 1/1997 |
| DE | 102004008383 A1 | 9/2005 |
| DE | 102012007021 B3 | 8/2013 |
| DE | 102012102579 A1 | 9/2013 |
| DE | 102012015377 B3 | 12/2013 |
| DE | 102013100786 A1 | 7/2014 |
| EP | 2479450 A1 | 7/2012 |
| EP | 2520817 A1 | 11/2012 |
| WO | WO 0179724 A1 | 10/2001 |
| WO | WO 2007111704 A2 | 10/2007 |

* cited by examiner

METHOD FOR MONITORING A BRAKE FOR MOTOR VEHICLES, BRAKE SYSTEM FOR IMPLEMENTING THE METHOD, AND MOTOR VEHICLE COMPRISING SAME

CROSS REFERENCE TO RELATED APPLICATIONS

This application is a U.S. National Phase application under 35 U.S.C. § 371 of International Application No. PCT/EP2016/000176 (WO 2016/124331 A1), filed on Feb. 3, 2016, and claims benefit to German Patent Application No. DE 10 2015 001 152.9, filed Feb. 2, 2015.

FIELD

The invention relates to a method for monitoring a brake for motor vehicles, wherein an air gap of the brake is detected using measured position values provided by a brake wear sensor. The invention additionally relates to a brake system for motor vehicles comprising a monitoring electronics system for monitoring the air gap and to a motor vehicle comprising such a brake system.

BACKGROUND

An air gap is understood to be the distance between the brake pad and the associated friction partners on the vehicle wheel. A gap between the brake pad and the friction partner, for example a brake disk, is required so that the friction partner can move freely in the unbraked state. The air gap must not be too great in this case, however, since the proper performance of the brake could be adversely affected otherwise. On the other hand, brakes having an insufficient air gap tend to overheat. The actual air gap should therefore not fall below a lower limiting value and, on the other hand, should not exceed a predetermined upper limiting value.

The monitoring of a brake is that much more accurate, in this case, the more accurate the knowledge of the air gap is. A great deal of effort is required to determine the air gap during the travel of a motor vehicle and often succeeds only with unsatisfactory accuracy.

EP 2 520 817 A1 discloses a method for monitoring a brake for motor vehicles and an air gap detector, wherein the air gap of the brake is determined by utilizing measured position values of a brake wear sensor. The brake wear sensor is a displacement sensor which signals the wear of the brake pad. An evaluation unit detects the air gap in such a way that a warning display is activated upon detection of an increase in the air gap that is defined with respect to a predetermined setpoint air gap and, therefore, upon detection of an air gap that is too great. In the case of the known device, the brake wear sensor and the evaluation unit are designed in such a way that a present air gap is detected as the actual air gap by evaluating the signal difference provided by the brake wear sensor in the case of an actuated brake and an unactuated brake and, therefore, any deviation of the air gap from the setpoint air gap should be detectable. It has been shown, however, that a precise determination of the actual air gap is often not possible in this way. For example, displacements that are many times greater than the setpoint air gap are measured due solely to elastic expansion in the case of functional components of the brake, for example the brake caliper.

SUMMARY

In an embodiment, the present invention provides a method for monitoring a pneumatically actuatable brake for motor vehicles, wherein an air gap of the brake is ascertained using measured position values provided by a brake wear sensor. The method includes ascertaining a reference position value of the brake wear sensor during unbraked travel, determining multiple value pairs of discrete position values and a current brake pressure P at a same point in time during a braking procedure, ascertaining a characteristic function interpolating the value pairs, determining a characteristic position value according to the characteristic function for a selected brake pressure, and determining an actual value of the air gap by subtracting the reference position value from the characteristic position value.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
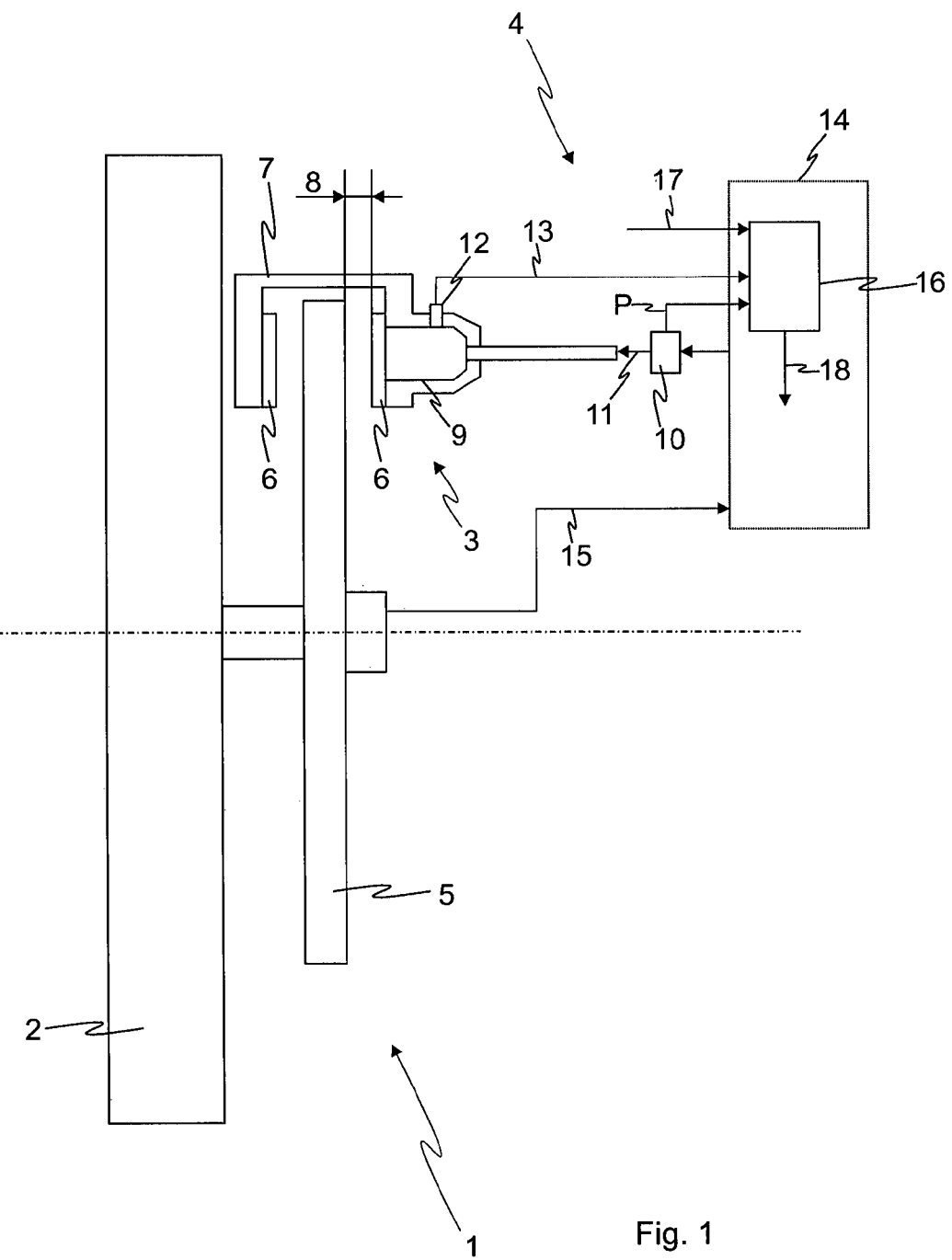
FIG. 1 shows a schematic view of an exemplary embodiment of a brake system for motor vehicles.

According to embodiments of the invention, it is provided that a reference position value of the brake wear sensor is ascertained during unbraked travel and is made available for the determination of the actual air gap. During a braking procedure, i.e., during a pneumatic actuation of the brake, multiple value pairs are formed from discrete position values and a present brake pressure of the brake at the same point in time. The discrete position values in this case are position values at certain points in time and, advantageously, can be individualized by being stored and can be made available to be linked to the brake pressure. On the basis of the value pairs, a characteristic function interpolating the value pairs is ascertained in a further step of the method according to the invention for monitoring a pneumatically actuatable brake. The interpolating characteristic function is a constant function which depicts the predetermined, discrete data, i.e., the value pairs of position values and the associated brake pressure at the same point in time. A characteristic position value is determined for a selected brake pressure according to the characteristic function ascertained according to the invention. The precise value of the actual air gap is ascertained by subtracting the reference position value of the brake wear sensor, which is ascertained during unbraked travel, from the characteristic position value for the selected brake pressure.

Forces acting on the functional components during the braking procedure result in elastic deformations, for example an expansion of the brake caliper and, as a result, a determination of the air gap of the brake on the basis of the measurement signal provided by the brake wear sensor is corrupted in an uncontrollable way. This is taken into account, according to embodiments of the invention, by taking the brake pressure into consideration. Advantageously, a control pressure of an electronic brake system is utilized as the information regarding the present brake pressure for the determination of the air gap. The brake pressure at a pressure modulator of the relevant brake is preferably utilized in this case.

Uncontrollable influencing factors are eliminated by way of the interpolation of the value pairs. A characteristic function interpolating the value pairs is also representative outside of the measurement ranges that are taken into account in order to form the value pairs. A suitable brake pressure can therefore be selected in order to ascertain the characteristic position value from the interpolating or interpolated characteristic function. In one advantageous embodiment of the invention, an application pressure of the brake is selected as the characteristic position value. The application pressure is preferably assumed to be approximately 0.3 bar in this case. For the application pressure selected in this way, the interpolating characteristic function results in a specific characteristic position value, on the basis of which the air gap can be precisely ascertained after subtraction of the reference position value ascertained during unbraked travel.

A brake system for motor vehicles according to the invention, which comprises at least one pneumatically actuatable brake, includes a monitoring electronics system for monitoring the air gap of the brake, to which system the brake wear sensor of the particular brake is connected. The monitoring electronics system is designed, in this case, for ascertaining the reference position value of the brake wear sensor during unbraked travel; forming multiple value pairs of discrete position values and a present brake pressure at the same point in time during a braking procedure; ascertaining, from the value pairs, a characteristic function interpolating the value pairs; determining a characteristic position value for a selected brake pressure according to the characteristic function; and, finally, ascertaining the precise air gap by subtracting the reference position value from the characteristic position value. The air gap can therefore be ascertained in a structurally simple way in the case of a brake system for motor vehicles comprising a brake wear sensor situated on the brake when the monitoring electronics system is configured for carrying out the determination of the air gap according to the invention and information regarding the present brake pressure is made available. In motor vehicles comprising electronic brake systems, the information regarding the present brake pressure is generally available in a system-immanent manner, and so the air-gap monitoring according to the invention can take place using the sensor data provided by the brake system.

In one preferred embodiment, a lower limiting value and an upper limiting value for the air gap are specified for the monitoring electronics system. During the monitoring of the air gap, a fault is inferred when the air gap of the brake ascertained according to the invention falls below the predetermined lower limiting value or the ascertained air gap exceeds a predetermined upper limiting value. Due to the precise determination of the air gap, the limiting values for a narrow tolerance interval for the air gap can be specified, since dynamic influences on the determination of the air gap, for example load-induced changes in the brake geometry, are ruled out. Instead, an effective monitoring of the air gap is ensured, which infers faults only when the narrow limits of the permissible tolerance range of the air gap are exceeded according to the predetermined limiting values.

According to one embodiment of the invention, the brake wear sensor measures continuously, wherein its measured position values, as discrete position values, are linked to the particular brake pressure at the same time of measurement in order to form value pairs. Discrete position values are preferably made available by storing the position values in an appropriate memory element.

Value pairs for brake pressures above a predetermined minimum pressure are advantageously utilized for ascertaining the characteristic function, and so it is ensured that the brake has reliably overcome the air gap and the linear region of the braking characteristic curve has been reached. For example, the monitoring electronics system can be configured in such a way that value pairs for the determination of the air gap are first formed and utilized above a minimum pressure of approximately 0.75 bar.

Advantageously, the value pairs are interpolated to form a straight-line characteristic function. This succeeds, in particular, when value pairs are first ascertained above a minimum pressure. The straight-line characteristic function is also assumed for the selected brake pressure, and so a characteristic function value can be read out for the precise determination of the air gap.

In brake systems having antilock controls, so-called antilock brake systems, the previously formed value pairs of the relevant braking procedure are advantageously discarded for the determination of the air gap upon detection of an antilock engagement. If the brake system has an antilock control including an ABS electronics system designed therefor, the monitoring electronics system for monitoring the air gap is advantageously integrated into the ABS electronics system. As a result, the monitoring electronics system or the monitoring function implemented therefor can utilize components of the ABS electronics system and the information available in the ABS electronics system.

FIG. 1 shows a section of a motor vehicle 1, specifically a wheel 2 comprising a brake 3, as well as a section of an electronic brake system 4.

The brake 3 is designed as a disk brake and includes a brake disk 5 which rotates along with the wheel 2. The brake disk 5 is brakeable by way of brake pads 6 being pressed against the surface of the brake disk 5. The brake pads 6 are held, on both sides of the brake disk 5, on a brake caliper 7. Each of the brake pads 6 is spaced apart from the brake disk 5 via an air gap 8, and so the brake disk 5 can rotate freely in the unbraked state.

The brake 3 is pneumatically actuatable and includes a brake cylinder 9 acting on the position of the brake pads 6. The brake cylinder 9 is controlled by the electronic brake system 4. For this purpose, the electronic brake system includes a pressure modulator 10 which adjusts the pressure command 11 to the brake cylinder 9 according to the requirements of the electronic brake system.

The brake comprises a brake wear sensor 12 which measures position values 13 and ascertains the position of the brake pad along its predetermined displacement path.

In the exemplary embodiment shown, the electronic brake system 4 comprises an antilock brake system (ABS), of which the ABS electronics system 14 is symbolically represented. The ABS electronics system 14 provides the antilock control for the braking procedure. In this case, a locking tendency of a certain wheel 2 is inferred from an evaluation of the rotational speed 15 of the wheels 2 and the relevant wheel is acted upon via regulation of the brake pressure.

The electronic brake system 4 also includes a monitoring electronics system 16 for monitoring the air gap 8 of a brake 3. As described in greater detail in the following, the monitoring electronics system 16 ascertains the actual value 18 of the air gap 8 by utilizing the position values 13 provided by the brake wear sensor 12 and the brake pressure P of the particular brake 3. For this purpose, the monitoring electronics system 16 is provided with the present control pressure P of the electronic brake system 4, specifically the brake pressure P present at the pressure modulator 10.

The monitoring electronics system 16 is integrated into the ABS electronics system 14, or the ABS electronics system 14 at least partially carries out the function of the monitoring electronics system 16. The position values 13 provided by the brake wear sensor 12 and the brake pressure are utilized for carrying out the function of the monitoring electronics system 16, which position values and which pressure are retained and utilized for the function of the electronic brake system 4 and for the antilock brake system. In addition, the monitoring electronics system 16 is supplied with a braking indication 17 which indicates to the monitoring electronics system 16 that a braking procedure 24 (FIG. 3) has been demanded or has already been initiated. In the exemplary embodiment shown, the braking indication 17 is an activation signal of a brake light switch (not shown) of the motor vehicle 1.

Figure 2:
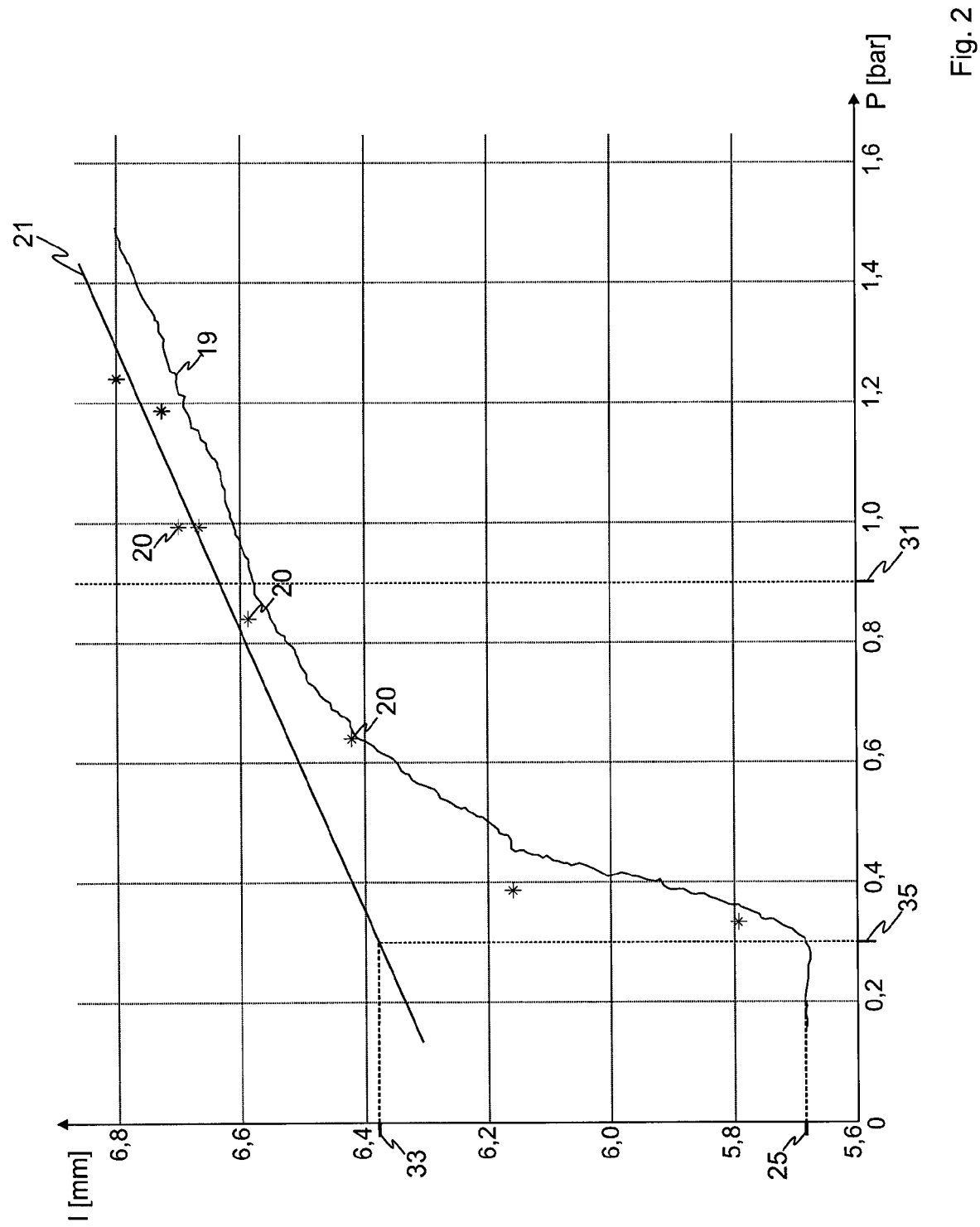
FIG. 2 shows a graphic illustration of a characteristic function for the determination of the air gap according to the invention.
Figure 3:
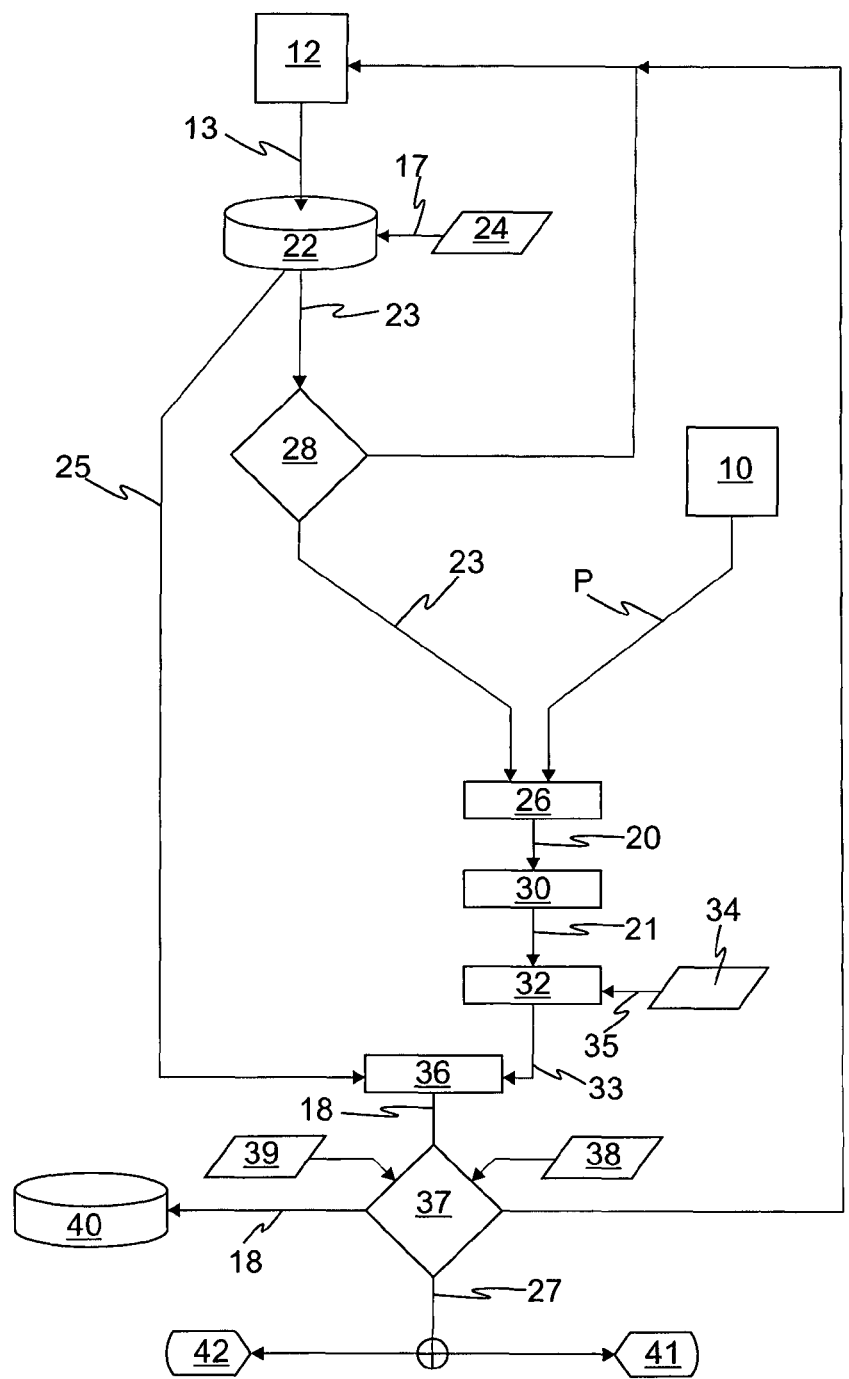
FIG. 3 shows a flow chart of an exemplary embodiment of a method for monitoring a pneumatically actuatable brake for motor vehicles.

The monitoring electronics system 16 is designed and configured for carrying out the method—which is described in the following with reference to FIG. 2 and FIG. 3—for monitoring the brake 3, including a determination of a precise actual value of the air gap 8. FIG. 2 shows a Cartesian coordinate system including graphic progressions, wherein a pressure P on the x-axis is plotted against position values in the dimension length l, which are measured by the brake wear sensor 12. In this case, the illustration shows the progression 19 of the pressure in the brake cylinder during a braking procedure in relation to the synchronously measured position values of the brake wear sensor 12. Furthermore, discrete value pairs 20—the determination of which is described in the following with reference to FIG. 3—and a characteristic function 21 interpolating the value pairs 20 are shown.

During the monitoring of the brake 3 and the determination of the air gap 8, the brake wear sensor 12 continuously measures position values 13, wherein the measured values can be stored in a memory element 22. Discrete position values 23 including a reference, in particular the time of measurement, can be read out of the memory element 22. In the exemplary embodiment shown, the measured position values 13 are stored after the monitoring electronics system has received the braking indication 17, i.e., a braking procedure 24 of the motor vehicle 1 has been demanded. The braking indication 17 takes place by way of a corresponding evaluation of the switching state of a brake light switch of the motor vehicle 1, or its output signal. If a braking procedure 24 is indicated to the monitoring electronics system 16, the presently measured position value 13 is stored. In this way, a (time-) discrete reference position value 25 of the brake wear sensor during unbraked travel of the motor vehicle 1 is ascertained and is made available for the subsequent utilization during the determination of the air gap 8.

During the braking procedure 24, continuously measured position values 13 are stored and retained for the determination of the ventilation gap.

A determination 26 of multiple value pairs 20 is carried out using discrete position values 23 and information regarding the particular brake pressure P at the same point in time. The discrete position values 23 are linked, with the present brake pressure P at the same point in time, to form value pairs 20 in a linking step 26. The information regarding the present brake pressure P is provided by the electronic brake system 4. In the exemplary embodiment shown, the brake pressure P taken into account in the value pairs 20 is the control pressure at the pressure modulator 10 (FIG. 1). Before the determination 26 of the value pairs 20, however, a query 28 of the status of the antilock brake system takes place. Upon detection of a braking procedure including antilock engagement of the antilock control, the ascertained values of the relevant braking procedure 24 are discarded for the determination of the air gap 8. In this case, the method in the flow chart according to FIG. 3 returns to the starting point in the arrow direction 29.

A determination 30 of the characteristic function 21, which interpolates the value pairs 20 and is represented in FIG. 2, takes place by means of an interpolation algorithm on the basis of the value pairs 20 of the discrete position values 23 and the brake pressure P linked thereto. Brake pressures P above a predetermined minimum pressure 31 (FIG. 2) are utilized for the determination 30 of the characteristic function 21, and so it is ensured that the actual air gap 8 of the brake is overcome and values from the linear region of the braking characteristic curve are evaluated. The minimum pressure 31 is preferably assumed to be approximately 0.75 bar.

The characteristic function 21 is subsequently utilized for a determination 32 of a characteristic position value 33. The characteristic position value 33 for a selected brake pressure is determined according to the characteristic function 21, or the characteristic position value 33 for the selected brake pressure is read from the characteristic function 21. The brake pressure utilized for reading out the characteristic position value 33 is indicated by a pressure specification 34 in the exemplary embodiment.

The application pressure 35 of the brake is preferably determined as the pressure specification 34. The application pressure 35 of the brake is therefore selected as the characteristic position value 33 for reading out the characteristic function 21. The application pressure 35 in this case is the dimension of the brake pressure at which the brake pads are brought into engagement with the friction partner. Correspondingly, the progression 19 of the brake cylinder pressure (FIG. 2) signals an increase of the position value of the brake wear sensor after the application pressure 35 has been exceeded.

The value pairs 20 are interpolated to form a straight-line characteristic function 21, the progression of which is extended into the pressure range below the minimum pressure. The slope of the constant characteristic function 21 corresponds in this case to the linear region of the braking characteristic curve, which is situated above the predetermined minimum pressure 21.

Once the characteristic position value 33 and the reference position value 25 from unbraked travel are known, the air gap 8 is determined by subtracting 36 the reference position value 25 from the characteristic position value 33. The quantity determined via subtraction 36 corresponds to the precise actual value 18 of the air gap 8.

The actual value 18 of the air gap 8 determined in this way is finally compared, in a monitoring procedure 37, to the predetermined limiting values 38, 39. An upper limiting value 38, which is 1.4 mm, for example, is specified to the monitoring procedure 37. A lower limiting value 39, which is 0.5 mm in one advantageous exemplary embodiment, is also specified. The monitoring electronics system 16 infers a fault 27 during the monitoring of the brake when the actual value 18 of the air gap 8 falls below the lower limiting value 38 or exceeds the predetermined upper limiting value 39. If the actual value 18 of the air gap 8 is between the limiting values 38, 39, the actual value 18 of the air gap 8 is stored in a memory element 40 and is retained in the electronic brake system 4 for a further use of the information regarding the present air gap 8 of the relevant brake 3.

If the ascertained actual value 18 of the air gap 8 exceeds the upper limiting value 38, an excessively great air gap 8 is inferred as a fault 27 and a measure predetermined for this fault state 41 is initiated. If the actual value 18 of the air gap 8 is below the lower limiting value 39, the fault state 42 is inferred, in which an inadequate air gap 8 and, therefore, the tendency for the brake 3 to overheat, is assumed.

The method according to the invention and the brake system for carrying out the method are preferably utilized in commercial vehicles.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 motor vehicle
2 wheel
3 brake
4 electronic brake system
5 brake disk
6 brake pad
7 brake caliper
8 air gap
9 brake cylinder
10 pressure modulator
11 pressure command
12 brake wear sensor
13 position value
14 ABS electronics system
15 rotational speed
16 monitoring electronics system
17 braking indication
18 actual value of air gap
19 progression
20 value pair
21 characteristic function
22 memory element
23 discrete position value
24 braking procedure
25 reference position value
26 determination of value pairs
27 fault
28 ABS status query
29 arrow direction
30 determination of characteristic function (interpolation)
31 minimum pressure
32 read-out step
33 characteristic position value
34 pressure specification
35 application pressure
36 subtraction
37 monitoring procedure
38 upper limiting value
39 lower limiting value
40 memory element
41 fault state
42 fault state

The invention claimed is:

1. A method for determining a width of an air gap between a brake pad and a friction partner of a pneumatically actuatable brake, the method comprising:
    determining, by a brake wear sensor, a reference position value of the brake pad during unbraked travel of the vehicle;
    determining multiple value pairs, each value pair comprising a respective brake pressure and a corresponding position value of the brake pad measured by the brake wear sensor under the presence of the respective brake pressure;
    determining a characteristic function that defines characteristic position values of the brake pad for particular pressure values;
    determining a contact position value of the brake pad defined by the characteristic function for a predetermined application pressure; and
    determining the width of the air gap by subtracting the reference position value of the brake pad from the contact position value of the brake pad,
    wherein determining the characteristic function comprises:
        excluding, from the multiple value pairs, each value pair comprising a respective brake pressure that is less than a minimum threshold pressure so as to provide multiple remaining value pairs, and
        performing interpolation on the multiple remaining value pairs to provide the characteristic function, and
    wherein the threshold pressure is greater than the predetermined application pressure.

2. The method as claimed in claim 1, wherein a fault is inferred if the determined width of the air gap falls below a predetermined lower limiting value or if the determined width of the air gap exceeds a predetermined upper limiting value.

3. The method as claimed in claim 1, wherein the respective brake pressures of the multiple value pairs are control pressures of an electronic brake system.

4. The method as claimed in claim 1, wherein upon detection of a braking procedure including antilock engagement of an antilock control, the multiple value pairs are discarded for the determination of the air gap.

5. The method as claimed in claim 1, wherein the characteristic function is determined by performing linear interpolation on the multiple remaining value pairs.

6. A brake system for a motor vehicle, comprising:
a pneumatically actuatable brake;
a brake wear sensor assigned to the pneumatically actuatable brake; and
a monitoring electronics system configured to determine a width of an air gap of the pneumatically actuatable brake,
wherein the brake wear sensor is connected to the monitoring electronics system, and
wherein the monitoring electronics system is configured to:
  determine, by a brake wear sensor, a reference position value of the brake pad during unbraked travel of the vehicle;
  determine multiple value pairs, each value pair comprising a respective brake pressure and a corresponding position value of the brake pad measured by the brake wear sensor under the presence of the respective brake pressure;
  determine a characteristic function that defines characteristic position values of the brake pad for particular pressure values;
  determine a contact position value of the brake pad defined by the characteristic function for a predetermined application pressure; and
  determine the width of the air gap by subtracting the reference position value of the brake pad from the contact position value of the brake pad,
wherein the monitoring electronics system is configured to determine the characteristic function by:
  excluding, from the multiple value pairs, each value pair comprising a respective brake pressure that is less than a minimum threshold pressure so as to provide multiple remaining value pairs, and
  performing interpolation on the multiple remaining value pairs to provide the characteristic function, and
wherein the threshold pressure is greater than the predetermined application pressure.

7. The brake system as claimed in claim 6, wherein a lower limiting value and an upper limiting value for the width of the air gap are specified to the monitoring electronics system, wherein the monitoring electronics system is configured to infer a fault based on the determined width of the air gap falling below the lower limiting value or exceeding the upper limiting value.

8. The brake system as claimed in claim 6, wherein the brake is designed as a disc brake.

9. The brake system as claimed in claim 6, wherein the brake system is electronically controlled, and wherein a control pressure of the electronic brake system is made available to the monitoring electronics system.

10. The brake system as claimed in claim 6, wherein the brake system has an antilock control including an ABS electronics system.

11. The brake system as claimed in claim 10, wherein the monitoring electronics system is integrated into the ABS electronics system.

12. A motor vehicle comprising:
a brake system including:
  a pneumatically actuatable brake;
  a brake wear sensor assigned to the pneumatically actuatable brake; and
  a monitoring electronics system configured to determine a width of an air gap of the pneumatically actuatable brake,
wherein the brake wear sensor is connected to the monitoring electronics system, and
wherein the monitoring electronics system is configured to:
  determine, by a brake wear sensor, a reference position value of the brake pad during unbraked travel of the vehicle;
  determine multiple value pairs, each value pair comprising a respective brake pressure and a corresponding position value of the brake pad measured by the brake wear sensor under the presence of the respective brake pressure;
  determine a characteristic function that defines characteristic position values of the brake pad for particular pressure values;
  determine a contact position value of the brake pad defined by the characteristic function for a predetermined application pressure; and
  determine the width of the air gap by subtracting the reference position value of the brake pad from the contact position value of the brake pad,
wherein the monitoring electronics system is configured to determine the characteristic function by:
  excluding, from the multiple value pairs, each value pair comprising a respective brake pressure that is less than a minimum threshold pressure so as to provide multiple remaining value pairs, and
  performing interpolation on the multiple remaining value pairs to provide the characteristic function, and
wherein the threshold pressure is greater than the predetermined application pressure.

13. The method as claimed in claim 1, wherein the multiple remaining value pairs include at least three remaining value pairs each having a different respective brake pressure value, and
wherein the characteristic function is determined by performing interpolation between pairs of the at least three remaining value pairs.

14. The method as claimed in claim 1, wherein the respective brake pressures of the multiple value pairs are control pressures provided by a pressure modulator of the electronic brake system.

15. The method as claimed in claim 1, wherein the respective brake pressures of the multiple value pairs are control pressures provided by a pressure modulator.

16. The method as claimed in claim 1, wherein the minimum threshold pressure corresponds to a linear region of a brake pressure vs. brake pad position curve.

17. The method as claimed in claim 1, wherein the minimum threshold pressure is 0.75 to 0.9 bar.

18. The method as claimed in claim 17, wherein the predetermined application pressure is 0.3 bar.

* * * * *